FEED-THROUGH CAPACITOR

Filed Dec. 6, 1963

INVENTOR.
William W. Garstang
BY
Pendleton, Neuman,
Seibold & Williams
Attorneys 3,253,198
FEED-THROUGH CAPACITOR William W. Garstang, Milwaukee, Wis., assignor to Globe-Union Inc., Milwaukee, Wis., a corporation of Delaware Filed Dec. 6, 1963, Ser. No. 328,748
5 Claims. (Cl. 317—242)

This invention relates to feed-through capacitors and more particularly to such capacitors in which the disadvantageous effects of resonance are minimized.

Feed-through capacitors are commonly employed as filter-type connecting elements, to filter out unwanted high frequency components which may be present in an electrical signal.

For example, in a television receiver, an input signal is demodulated in a tuner, by mixing it with a local oscillator signal, and demodulated signal is amplified in the next amplifying stage. Only the demodulated signal is desired as an output from the tuner, and the high frequency carrier and local oscillator signals should not escape from the tuner chassis. The tuner chassis is commonly shielded by being surrounded by conductive walls forming a box, but the leads to the filament and other power supplies must pass through apertures in the box. Such apertures are adapted to contain feed-through capacitors having a definite capacitance between the leads and the chassis wall, by which the unwanted high frequencies are by-passed to the chassis wall, while the lower frequency signals proceed through the wall to the other side.

Capacitors of the discoidal type are known, and have been successfully employed for this purpose, but are relatively expensive. The tubular type of capacitor, on the other hand, may be manufactured quite inexpensively, but its electrical characteristics suffer from a resonance phenomenon, due to the length of the capacitor in the direction transverse to the wall in which it is mounted. The resonance phenomenon arises because the length of such a capacitor is a substantial fraction of the wave length of the unwanted frequencies, the wave lengths of signals traveling through dielectric material being much shorter than those traveling through air. When the length of the capacitor is approximately ¼ wave length of the signal passing through it, the dielectric of the capacitor acts as a resonant cavity, and materially affects the characteristics of the capacitor to provide less attenuation for those frequencies.

In the prior art, various attempts have been made to avoid the above difficulties in various ways. Many attempts have been made to reduce resonance by incorporating some high loss material, e.g. such as ferrite, with the capacitor. None of the prior attempts, however, have been completely successful in producing a feed-through capacitor which is simple and inexpensive to manufacture, and which substantially eliminates the adverse characteristics of resonance.

The present invention contemplates an improved feed-through capacitor in which the electrical characteristics, and particularly the attenuation characteristic, are materially improved over those of previously known capacitors. Capacitors constructed in accordance with the present invention maintain an attenuation level of at least 30 db above 200 megacycles.

Accordingly, it is a principal object of the present invention to provide a feed-through capacitor having an improved attenuation characteristic.

Another object of the present invention is to provide a feed-through capacitor which may be manufactured relatively easily and inexpensively.

A further object of the present invention is to provide a method for manufacturing an improved feed-through capacitor.

These and other objects and advantages of the present invention will become manifest through an examination of this specification and the accompanying claims and drawings.

In accordance with one embodiment of the present invention, there is provided a tubular feed-through capacitor in which the outer electrode is conformed with a plurality of discontinuities in overlapping relation with respect to the longitudinal dimension of the capacitor such as to prevent the electrode from being continuous in an axial direction for more than a small fraction of the wave length, in the dielectric, of the frequencies to be attenuated.

Reference will now be made to the accompanying drawings, in which.

Figures 1, 2, 3, 4:
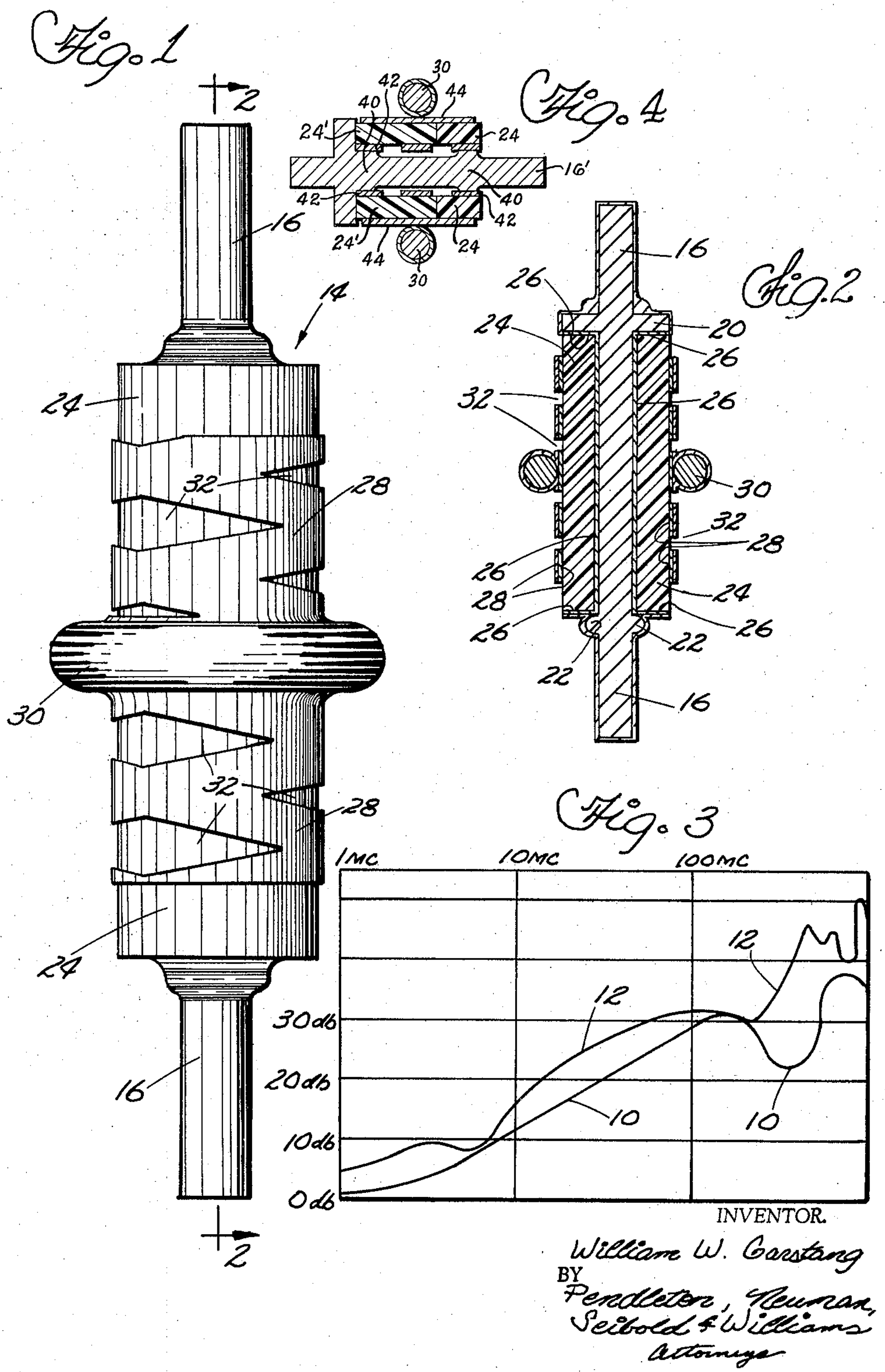
FIG. 1 is a side view of a capacitor constructed in accordance with the present invention.
FIG. 2 is a cross-sectional illustration of the capacitor of FIG. 1.
FIG. 3 is a graph of comparative attenuation curves illustrating the advantages of the present invention.
FIG. 4 is a cross-sectional illustration of an alternative embodiment of the present invention.

Referring first to FIG. 3, the attenuation characteristic of a typical prior art tubular capacitor is illustrated by curve 10. The capacitor having the characteristic illustrated in curve 10 is a tubular capacitor having a solid, one piece dielectric layer, and an outer electrode in the form of a continuous circular cylinder overlying the dielectric. It will be noted from FIG. 3 that the attenuation characteristic of this capacitor has a pronounced decrease in attenuation, or resonant point, at about 400 megacycles. This dip in attenuation is due to the resonance phenomena determined by the length of the capacitor being an appreciable fraction of the wave length of a signal at 400 megacycles.

For the purposes for which feed-through capacitors are employed, it is important that such capacitors have relatively great attenuation above 200 megacycles, and preferably the attenuation should be greater than 30 db above 200 megacycles. It is obvious that the prior art capacitor indicated by curve 10 does not meet this specification, and if a frequency component were included in either the carrier or local oscillator signals corresponding to about 400 megacycles, a substantial amount of this energy would be permitted to escape from the tuner chassis to interfere with the proper operation of the apparatus.

The curve 12 of FIG. 3 which represents the attenuation characteristic of the present invention, contrasts with the curve 10 by illustrating a characteristic which is substantially devoid of a resonance peak, and a corresponding loss in attenuation. While it is true that the curve 12 does illustrate some departures from a straight line of constant positive slope, the departures from this line are not nearly so exaggerated as those of the curve 10. Accordingly, the capacitor of the present invention can be employed much more satisfactorily in a feed-through application, in connection with a tuner, for example, and substantially less unwanted high frequency energy is permitted to escape the confines of the tuner chassis when the novel capacitor is used.

Referring now to FIGS. 1 and 2, there is shown a capacitor 14 embodying the present invention, and which has an attenuation characteristic similar to that indicated by the curve 12 of FIG. 3.

The capacitor 14 is formed on a lead 16 which is provided with an upset flange 20 and a pair of staked ears 22 spaced therefrom. The flange 20 and the ears 22 support a tubular ceramic body 24, surrounding the lead 16, which serves as the dielectric layer of the capacitor. The interior and end surfaces of the ceramic body 24 are covered with a coating of conductive paint 26, which coating is in electrical contact with the lead 16, the flange 20, and the ears 22. The coating 26 serves as the inner electrode of the capacitor. A layer 28 of conductive material overlies the exterior surface of the ceramic body 24, and forms the outer electrode of the capacitor.

The ceramic body 24 is provided near the center of its length with an outwardly projecting bulge or flange 30, defined by a C-ring of copper or the like, which is adapted to be placed in electrical contact with the wall of the chassis in which the capacitor is mounted, by inserting one of the ends of the capacitor 14 through an aperture in the wall. The C-ring forming the flange 30 slips over the central portion of the outer electrode 28, and is soldered thereto as hereinafter described. The capacitor may be secured to the wall by soldering the flange 30 to the wall, which at the same time provides a rigid mechanical connection, and good electrical contact.

The pattern of the outer electrode 28 includes a plurality of generally diamond-shaped openings or spaces 32 in which the conductive material forming the electrode 28 is not applied to the dielectric 24. The diamond-shaped openings are disposed in overlapping arrangement as shown, so that the acute apexes of the diamonds 32 overlap with each other to break-up the longitudinal dimension of the outer electrode 28 into a series of shorter conductive lengths, so that the outer electrode 28 of the capacitor is at no place continuous along the line parallel to the axis of the capacitor. This pattern arrangement effectively breaks up the single dielectric resonant cavity formed by the dielectric body 24 into a plurality of smaller cavities, each having a length equal to the distance between overlapping portions of the diamonds 32. The resonant frequencies of the smaller cavities are higher than that of a large cavity, and are beyond the range of frequencies encountered in any particular application of the capacitor. The capacitor, therefore, does not exhibit the resonant phenomenon in connection with signals of relatively low frequency.

The pattern of the outer electrode 28 of the capacitor illustrated in FIG. 1 may be considered as being made up of two similar helical patterns of opposite pitch. Thus, one helix advances in a right-hand direction from one end of the capacitor to the other, while the other helix advances in a left-hand direction.

It would seem logical, from the foregoing explanation, that an outer electrode pattern consisting of a single helix would also provide improved results, since the longitudinal dimension of the outer electrode would in that case also be discontinuous. It has been found, however, that a pattern in the form of a single helix produces little or no improvement over a capacitor having a continuous conductive sheath as an outer electrode. The superior result attributable to the pattern arrangement illustrated in FIG. 1 is therefore a most surprising result, and one which has not as yet been completely and satisfactorily explained.

The pattern of the outer conductor of the capacitor of FIG. 1 may be applied either by brushing the helices onto the ceramic body 24 by hand, or by applying the pattern by silk screen or roller printing techniques. An alternative process of applying the outer conductor is by forming a pattern on the dielectric in the form of a continuous layer of conductive material as by dipping or the like, and then abrading the conductive material at locations corresponding to the diamonds of FIG. 1 to remove the conductive coating from those locations.

The preferred manner of applying the outer conductive layer is to apply a coating of a conductive substance such as silver to the surface of the dielectric body 24, after printing a suitable mask on the dielectric surface, with lacquer or the like, to mask off the diamond portions thereof from the silver coat. The C-ring 30 is then secured to the exterior of the central portion of the pattern, and the entire device dipped in solder, which adheres to the metal parts of the capacitor, and firmly secures the C-ring to the outer electrode, and the lead 16 to the inner electrode, by running between the lead 16 and the inner electrode 26.

Although a capacitor in accordance with the present invention has been illustrated as having diamond-shaped openings, the present invention contemplates openings of other shapes, the requirement being that the openings overlap so that the longitudinal dimension is broken up. Openings of random size and shape might be alternatively employed, but the illustrated dual helix arrangement is preferred because of its relative ease of manufacture.

The size of the openings does not appear to be critical, and it appears that the more openings which are provided in the outer electrode, the higher will be the resonant frequency, with an accompanying reduction of resonance effects within any relatively lower frequency band.

The two helices may be electrically insulated from each other without appreciably departing from the improved attenuation characteristic 12 of FIG. 3. In one embodiment of the present invention, which was formed by separately hand painting the two helices of the pattern, and applying a layer of insulating varnish between the two helices, an attenuation characteristic was obtained which was quite similar to that produced when the two helices were not insulated from each other.

The dielectric employed in the capacitor is preferably formed of two or more portions having different dielectric constants as the two dielectric portions 24 and 24' of FIG. 4. The interface at which the two differing dielectric materials join, forms a boundary which operates in a manner similar to the dual helical pattern in breaking up a large resonant cavity into smaller physical portions having resonant frequencies above the frequency range of interest. In addition, the proportionate length of each the dielectric sections may easily be varied to provide a continuous range of capacitances without materially affecting the attenuation characteristic for relatively high frequencies, and without varying the physical dimensions or voltage breakdown value of the capacitor. Capacitors constructed in accordance with this invention may be varied over a wide range of capacitances, especially below 4,000 pf. by selection of the relative proportions of various dielectric materials, while maintaining the physical size of the capacitor about ½ inch long and adhering closely to the attenuation characteristic curve 12 of FIG. 3.

Although the capacitor of the present invention has been described as having the outer electrode formed in a particular pattern, it is also within the scope of this invention to form the inner conductor in similar pattern instead (FIG. 4). This may be done by raising portions 40 of the surface of the central conductor 16' where the pattern 42 is to contact the dielectric, and leaving an air space between the remaining portions of the central conductor 16' and the inner pattern on the dielectric body 24. The outer conductor 44 is continuous. Alternatively, a single helix may be provided as the inner electrode, and a second, oppositely wound helix provided as the outer electrode to achieve the deresonated advantages of the present invention.

From the foregoing, the present invention has been sufficiently described as to enable others skilled in the art to adapt the same under varying conditions of service without departing from the essential features of novelty involved, which are intended to be defined and secured by the appending claims.

What is claimed is:

1. A feed-through capacitor comprising a central conductor, a tube of dielectric material surrounding said conductor intermediate its ends, and an outer conductive layer disposed in overlying relationship on said dielectric layer, said outer layer having a plurality of spaced openings therein disposed in overlapping relationship along a line parallel to said center conductor, said openings being defined by a pair of helical stripes winding oppositely about said dielectric layer, each of said stripes having the same width and successive convolutions of each of said stripes being spaced apart by the same distance.

2. A feed-through capacitor comprising an elongate conductor, a layer of dielectric material surrounding said conductor intermediate its ends, a first coating of conductive material overlying said layer in the form of a first helical stripe having constant width and pitch, a coating of insulating material overlying said first conductive coating, and a second conductive coating overlying said insulating material, in the form of a second helical stripe winding in the opposite direction from said first stripe.

3. A feed-through capacitor comprising an elongate conductor, a tube of dielectric material surrounding said conductor intermediate its ends, a first coating of conductive material overlying the interior surface of said tube and in electrical contact with said conductor, a second coating of a conductive material overlying the exterior surface of said tube and insulated from said first coating, said second coating having a plurality of discontinuities, aligned in spaced overlapping relationship to render said second coating discontinuous along any line parallel to said conductor, and a conductive terminal member surrounding said second coating at substantially the central portion thereof and in electrical contact therewith, said tube comprising a plurality of aligned tubes in coaxial tandem relationship formed of dielectric materials having different dielectric constants.

4. A feed-through capacitor comprising a central conductor, a tube of dielectric material surrounding said central conductor intermediate its ends, an inner electrode disposed between and in contact with said central conductor and said tube, an outer electrode disposed in overlying relationship on the exterior of said tube, one of said electrodes having a plurality of spaced openings therein disposed in overlapping relationship along a line parallel to said central conductor, wherein said inner electrode contacts said central conductor at spaced apart locations and is elsewhere spaced from said central conductor.

5. A feed-through capacitor comprising a central conductor, a tube of dielectric material surrounding said central conductor intermediate its ends, an inner electrode disposed between and in contact with spaced apart locations of said central conductor and with said tube, said inner electrode comprising a helical stripe of constant width and pitch, an outer electrode disposed in overlying relationship on the exterior of said tube, said outer electrode comprising a helical stripe of the same width and pitch as said inner electrode, but winding in the opposite direction about said tube.

References Cited by the Examiner

UNITED STATES PATENTS

| | | | |
|---|---|---|---|
| 3,007,121 | 10/1961 | Schlicke ---------- | 317—242 X |
| 3,035,237 | 5/1962 | Schlicke ---------- | 317—242 X |
| 3,052,824 | 9/1962 | Haken et al. ----- | 317—242 X |

ROBERT K. SCHAEFER, *Primary Examiner.*

JOHN F. BURNS, D. JAMES BADER, *Examiners.*